United States Patent Office 3,197,427
Patented July 27, 1965

3,197,427
CATIONIC THERMOSETTING POLYAMIDE-EPI-CHLOROHYDRIN RESINS OF IMPROVED STABILITY AND PROCESS OF MAKING SAME
Alfred C. Schmalz, Hollins, Va., assignor to Hercules Powder Company, Wilmington, Del., a corporation of Delaware
No Drawing. Filed July 12, 1963, Ser. No. 294,760
3 Claims. (Cl. 260—29.2)

This is a continuation-in-part of my copending application Serial No. 12,951, filed March 7, 1960, which in turn is a continuation-in-part of my application Serial No. 796,742, filed March 3, 1959, now abandoned.

This invention relates to cationic thermosetting polyamide-epichlorohydrin resins having improved stability and to a method of preparing same.

It is known that certain cationic thermosetting resins formed by reacting a polyamide of a polyalkylene polyamine and a dicarboxylic acid selected from the group consisting of diglycolic acid and saturated aliphatic dicarboxylic acids with epichlorohydrin are very efficient wet-strength resins for paper. Moreover, they can be used under alkaline as well as neutral or acid conditions, thus making the production of alkaline wet-strength paper economically feasible. However, because of the high activity of resins of this type before aging, steps must be taken to stabilize them against gelation and loss of wet-strength efficiency.

In my earlier experiments with these resins I found that satisfactory stability against gelation and loss of wet-strength efficiency could be attained if the pH of the final resin solution was adjusted to about 2.0 by the addition of a mineral acid, e.g., sulfuric acid, the resin solution then aged for several days and the pH then readjusted to about 2.0 with additional acid. However, this procedure was subject to the disadvantage that storage facilities had to be provided for aging the resin solution prior to the readjustment of pH thus adding to the cost of manufacture.

I had also found that reasonably good stability against gelation and loss of wet-strength efficiency could be obtained by adjusting the pH of the final resin solution to a fairly critical area within the range between 3.0 and 3.5 with formic acid. However, this procedure was subject to the disadvantage that adjustment to this rather limited critical pH area was difficult to attain and control in commercial operations.

A principal object of the present invention is the provision of cationic polyamide-epichlorohydrin resins of the indicated type which have satisfactory stability against gelation and loss of wet-strength efficiency and which do not require aging and readjustment of pH or operation within a small pH range.

Another object of the invention is the provision of a process for making such resins.

In accordance with the present invention, cationic water-soluble polyamide-epichlorohydrin resins of the indicated type having satisfactory stability against gelation and loss of wet-strength efficiency are prepared by adjusting the pH of the final resin solution by the conjoint use of formic acid and sulfuric acid in the manner hereinafter described. In some cases, it may also be desirable to adjust the pH of the polyamide solution prior to reacting with epichlorohydrin. The cationic water-soluble polyamide-epichlorohydrin resins formed as generally described above and as more specifically described below exhibit good stability against gelation and loss of wet-strength efficiency over relatively long periods of time at total solids contents of 25% and above.

In the preparation of the improved cationic thermosetting resins in accordance with the invention the dicarboxylic acid is first reacted with a polyalkylene polyamine, preferably in aqueous solution, under conditions such as to produce a water-soluble, long-chain polyamide containing the recurring groups —NH($C_nH_{2n}$HN)$_x$—CORCO— where $n$ and $x$ are each 2 or more and R is the divalent organic radical of the dicarboxylic acid. If necessary, and/or desirable, the pH of the resulting polyamide solution may then be adjusted within the range from about 8.5 to 9.0, the polyamide reacted with epichlorohydrin, and the pH of the resulting product adjusted as hereinafter described.

The dicarboxylic acids contemplated for use in preparing the resins of the invention are the saturated aliphatic dicarboxylic acids preferably containing from 3 to 8 carbon atoms, such as malonic, succinic, glutaric, adipic and so on, together with diglycolic acid. Of these, diglycolic acid and the saturated aliphatic dicarboxylic acids having from 4 to 6 carbon atoms in the molecule, namely, succinic, glutaric and adipic, are most preferred. Blends of two or more of these dicarboxylic acids may also be used, as well as blends of one or more of these with higher saturated aliphatic dicarboxylic acids such as azelaic and sebacic, as long as the resulting long-chain polyamide is water soluble or at least water dispersible.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention are polyamines containing two primary amine groups and at least one secondary amine group in which the nitrogen atoms are linked together by groups of the formula —$C_nH_{2n}$— where $n$ is a small integer greater than unity and the number of such groups in the molecule ranges from two up to about eight and preferably up to about four. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, defined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups.

The term "polyalkylene polyamine" employed in the claims, therefore, refers to and includes any of the polyalkylene polyamines referred to above or to a mixture of such polyalkylene polyamines.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine, or a heterocyclic diamine such as piperazine or the like for a portion of the polyalkylene polyamine. For this purpose up to about 60% of the polyalkylene polyamine may be replaced by a molecularly equivalent amount of the diamine. Usually, a replacement of about 30% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times may be utilized, depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1 and preferably from about 0.92:1 to about 1.14:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products do not produce efficient wet-strength resins when reacted with epichlorohydrin.

In converting the aqueous polyamide, formed as above described, to a cationic thermosetting resin, it is reacted with epichlorohydrin at a temperature from about 45° C. to about 100° C. and preferably from about 45° C. to about 70° C. and held at this temperature until the viscosity of the solution has reached the desired Gardner viscosity, i.e., at least <B, and preferably at least D, for about 25% solids resins, and at least M, and preferably at least X for about 50% solids resins. This reaction is preferably carried out in aqueous solution to moderate the reaction. The reaction may also be moderated by decreasing the pH of the aqueous polyaminoamide solution with acid prior to addition of epichlorohydrin or immediately after the addition of epichlorohydrin. This adjustment is preferably made to a pH 8.5–9.5 but may be made to pH 7.5 in some cases with quite satisfactory results. Any suitable acid, e.g., mineral acids, can be used for this purpose. When the desired viscosity is reached, the product is cooled to about 25° C. and then stabilized by reducing the pH by the conjoint use of formic acid and sulfuric acid in the manner hereinafter described.

In the polyamide-epichlorohydrin reaction, it is preferred to use sufficient epichlorohydrin to convert all secondary amine groups to tertiary amine groups and/or quaternary ammonium groups including cyclic structures. However, more or less may be added to moderate or increase reaction rates. In general, it is contemplated utilizing from about 0.5 mole to about 1.8 moles of epichlorohydrin per mole polyamide secondary amine. It is preferred to utilize from about 0.9 mole to about 1.5 moles of epichlorohydrin per mole of polyamide secondary amine group.

In accordance with the invention, the cationic water-soluble polyamide-epichlorohydrin resins hereinabove described are stabilized by adjusting the pH of the resin solution first with formic acid and then with sulfuric acid. The formic acid is added in an amount sufficient to adjust the pH to the range from about 3.0 to about 4.0. The sulfuric acid is then added in an amount sufficient to adjust the pH to the range from about 2.0 to about 3.0.

Resins stabilized with formic acid and sulfuric acid in the indicated manner remain fluid for more than 90 days at 32° C. without a supplementary adjustment of pH. This stability, moreover, is attained without sacrifice of wet-strength efficiency of the reisn and, in some cases, with an actual increase in off-the-machine wet strength.

The polyamide-epichlorohydrin resins, prepared as herein described, may be incorporated into pulp slurry at any point on the wet end of the paper machine. They may also be applied from a tub size or at a size press or from showers to the dried or partially dried sheet. For most purposes, adequate wet strength may be obtained by incorporating in the paper from about 0.25% to about 3% of the resin based on the dry weight of the pulp. However, in special cases, up to 5% or more may be used.

The following examples will illustrate the invention.

EXAMPLE 1

Two hundred twenty-five parts of diethylenetriamine and 108 parts of water were placed in a reaction vessel and agitated. To this was added 327 parts of adipic acid. After the acid had dissolved in the amine, the solution was heated to 165–170° C. and held there until the reaction was completed. Then 503 parts of water was added. The resulting polyamide solution contained about 51.0% solids and had an intrinsic viscosity at 25° C. of 0.125±0.005 in 1 N ammonium chloride solution.

EXAMPLE 2

To 100 parts of the polyamide solution of Example 1 was added about 395 parts of water. This solution was heated to 50° C. and 25.5 parts of epichlorohydrin was added. The mixture was then heated to about 70° C. until it had obtained a viscosity of D–E (Gardner-Holdt scale at 25° C. and 14.5% solids). Then 181.8 parts of water was added to the product, it was cooled to 25–30° C., and sufficient 10% HCl added to adjust the pH to about 5.0. The product contained about 10% solids and had a Gardner-Holdt viscosity at 25° C. of C–D.

EXAMPLES 3–8

A solution of 63.0 g. (0.3 mole secondary amino nitrogen, dry basis) of polyamide, prepared as in Example 1, in about 265 g. of water (including the water present in the polyamide) was adjusted to pH 8.8 to 9.0 with concentrated sulfuric acid. The solution was stirred and heated to 50° C. while 31.0 g. (0.335 mole) of epichlorohydrin was added. The temperature of the solution was raised to about 60° C. and held until the solution had a Gardner-Holdt viscosity at 25° C. of about D. At this point, the reaction was terminated and the resin stabilized by addition of acid with stirring while the product was cooled to 25° C. A series of resins prepared in this manner were stabilized with various acids as indicated in Table 1 and evaluated for wet-strength properties in comparison with the resin of Example 2 as a control in accordance with the following procedure:

Tacoma bleached kraft pulp or unbleached kraft pulp was beaten to a Schopper-Riegler freeness of 750 cc. in a Noble and Wood cycle beater. The pH of the pulp was 7.5 to 7.8. To separate portions of each of these pulps were added 1.0% portions of each of the above-described resins based on the dry weight of pulp. The pulp, in each case, was sheeted on a Noble and Wood handsheet machine using a closed system. The white water contained 50 to 100 p.p.m. sulfate ion and had been adjusted to pH 7.5 with sodium bicarbonate solution. The resulting handsheets were run through press rolls and then drum dried according to the usual procedure. Portions of the resulting handsheets were cured for one hour at 105° C. The sheets tested for wet strength were soaked for 2 hours in distilled water. Results are listed in Table 1.

The reaction mixture was then cooled to 140° C. and diluted with 450 parts of water. The product was then cooled to 25° C. It contained 48.1% solids.

To 260 g. (126 g. dry basis) of the above polyamide solution in 410 g. of water (the solution had a pH of 8.9; no adjustment with acid was made) heated to 50° C. was added with stirring 62 g. of epichlorohydrin during a period of 5 minutes. The temperature of the solution was raised to about 70° C. where polymerization was allowed to proceed to a Gardner viscosity of about >B. The temperature was then lowered to about 55° C. where polymerization was continued to a Gardner viscosity of about D (total polymerization time, 1 hour and 8 minutes). The reaction was stopped by rapid cooling to 25°

Table 1

| Ex. No. | pH Adjustment | | | | | | Final Visc. | Total Solids, Percent | Days to Gel at— | | Efficiency | |
| --- | --- | --- | --- | --- | --- | --- | --- | --- | --- | --- | --- | --- |
| | From— | To— | Ml. of HCOOH/ 100 g. of Resin | From— | To— | Ml of H$_2$SO$_4$/ 100 g. of Resin | | | Room Temp.[1] | 90° F. | Pulp Used [2] | Relative to Control Resin (Ex. 2), Percent |
| 3 | 7.0 | 3.2 | 3.0 | | | | D | ca. 25 | >90 | >90 | UBK | = |
| 4 | | | | 7.0 | 2.0 | 0.6 | >C | 27.5 | | 17 | TBK | = |
| 5 | 7.2 | 3.5 | 2.3 | | | | >C | 26.4 | | <16 | TBK | 10< |
| 6 | 6.8 | 3.0 | ca. 3.4 | | | | C | 27.8 | >90 | >90 | TBK | 20< |
| 7 | 3.5 | 3.0 | 0.5 | 7.1 | [3]3.5 | 0.7 | <E | 26.0 | 46 | 25 | | |
| 8 | 7.1 | 3.5 | 1.5 | 3.5 | 3.0 | 0.65 | >D | ca. 25 | >90 | >90 | UBK | = |

[1] Approximately 20° to 30° C. (68° to 86° F.). When "greater than" symbol (>) is used, permanent stability may be assumed.
[2] TBK=Tacoma bleached kraft pulp, UBK=unbleached kraft pulp.
[3] pH adjusted first with sulfuric acid and then with formic acid.

EXAMPLE 9

Into a 1-liter, 3-necked, round-bottom flask fitted with mechanical stirrer, thermometer and distilling condenser were placed 200 g. (1.94 moles) of diethylenetriamine and 100 g. of water. The flask was flushed with nitrogen and kept under a nitrogen blanket throughout the reaction. To the well-stirred mixture was added, in 6 approximately equal portions, 290 g. (2.00 moles) of adipic acid. After the acid had dissolved in the amine, the solution was heated to 190±5° C. and held there for 1.5 hours. The reaction mixture was then cooled to 140° C. and diluted with 430.0 g. of water. The polyamide solution contained 53.8% solids and had an intrinsic viscosity (2% solution in 1 N ammonium chloride) of 0.116.

To a solution of 234 g. (126 g. dry basis) of the polyamide in 456 g. of water (pH 9.6; no acid adjustment was made at this point) heated to 50° C. was added with stirring 62 g. of epichlorohydrin over a period of 4 minutes. The temperature of the solution was raised to 60° C. where polymerization was allowed to proceed to a Gardner-Holdt viscosity of >D (1 hour and 24 minutes). The product was cooled to 25° C. and adjusted to pH 2.0 with 3.2 ml. of concentrated sulfuric acid. After 23 days the pH had risen to 3.9. The pH of a portion of this was thereupon readjusted to 2.5 with 0.3 ml. of concentrated sulfuric acid. It was stable at room temperature for more than 180 days. Another portion, the pH of which was not readjusted, gelled in less than 35 days. The product contained 24.6% solids (105° C. oven for 3 hours) and had a Gardner-Holdt viscosity of >D (Brookfield viscosity 87.7 cps. at 25° C.).

EXAMPLE 10

A polyamide was prepared as follows. Two hundred parts of diethylenetriamine and 96.3 parts of water were charged to a reaction vessel equipped with an agitator. The agitator was started and 290 parts of adipic acid was added at the rate of about 18.7 parts per 6 minutes. After the acid was added, the temperature of the charge was raised to 170±5° C. and held there for 1.5 to 3 hours.

C. with an ice-water bath. The product was divided into three parts designated 10a, 10b and 10c. To these, respectively, was added 1.5 ml., 2.0 ml., and 2.5 ml. of 88% formic acid per 100 g. of resin. The pH's of the three parts were now 3.5, 3.25 and 3.1. Finally, they were all adjusted to pH 3.0 with 10% sulfuric acid. Parts 10a, 10b and 10c were evaluated in paper in comparison with the resin of Example 2 as a control utilizing the same procedure as in Examples 3–8. Stability and wet-strength efficiency results are given in Table 2.

EXAMPLE 11

Using the procedure of Example 10, a resin which had a Gardner viscosity of >D was obtained in 1 hour and 29 minutes. The reaction was stopped by rapid cooling to 25° C. with an ice-water bath. The product was divided into three parts designated 11a, 11b and 11c. To these, respectively, was added 1.5 ml., 2.0 ml., and 2.5 ml. of 88% formic acid per 100 g. of resin. The pH's of the three parts were now 3.6, 3.6 and 3.3. Finally, they were all adjusted to pH 2.5 with 10% sulfuric acid. Parts 11a, 11b and 11c were evaluated in paper in comparison with the resin of Example 2 as a control utilizing the same procedure as in Examples 3–8. Stability and wet-strength efficiency results are given in Table 2.

EXAMPLE 12

Using the procedure of Example 10, a resin which had a Gardner viscosity of D was obtained in 1 hour and 3 minutes. The reaction was stopped by rapid cooling to 25° C. with an ice-water bath. The product was divided into three parts designated 12a, 12b and 12c. To these, respectively, was added 1.5 ml., 2.0 ml. and 2.5 ml. of 88% formic acid per 100 g. of resin. The pH's of the three parts were now 3.7, 3.5 and 3.4. Finally, they were all adjusted to pH 2.5 with concentrated sulfuric acid. Parts 12a, 12b and 12c were evaluated in paper in comparison with the resin of Example 2 as a control utilizing the same procedure as in Examples 3–8. Stability and wet-strength efficiency results are given in Table 2.

Table 2

| Ex. No. | Sample Designation | Added to 100 g. Resin | | pH | Percent TS | Stability (90° F.) | | | Wet Tensile[1] | | | |
|---|---|---|---|---|---|---|---|---|---|---|---|---|
| | | Ml. Formic Acid | Ml. Sulfuric Acid | | | Days | Visc. | pH | Experimental | | Control | |
| | | | | | | | | | Uncured | Cured | Uncured | Cured |
| 10 | 10a | 1.5 | 14.8 | 3.0 | ca. 24 | >90 | >C[2] | 3.7 | 6.6 | 9.3 | 6.6 | 9.2 |
| | 10b | 2.0 | 8.0 | 3.0 | 25.2 | >90 | <C[2] | 3.5 | 6.5 | 9.0 | 6.6 | 9.2 |
| | 10c | 2.5 | 3.3 | 3.0 | ca. 26 | >90 | >B | 3.5 | 6.7 | 8.9 | 6.6 | 9.2 |
| 11 | 11a | 1.5 | 1.6 | 2.5 | 25.2 | >90 | <B | 3.3 | 6.7 | 9.3 | 6.6 | 9.2 |
| | 11b | 2.0 | 26.6 | 2.5 | 23.0 | >90 | <A | 3.2 | 6.6 | 9.4 | 6.6 | 9.2 |
| | 11c | 2.5 | 24.3 | 2.5 | ca. 23 | >90 | <A | 3.1 | 6.7 | 9.6 | 6.6 | 9.2 |
| 12 | 12a | 1.5 | 1.7 | 2.5 | ca. 26 | >90 | <B | 3.2 | 5.8 | 8.9 | 5.3 | 8.9 |
| | 12b | 2.0 | 1.4 | 2.5 | 26.0 | >90 | A | 3.2 | 5.3 | 8.5 | 5.3 | 8.9 |
| | 12c | 2.5 | 1.4 | 2.5 | ca. 26 | >90 | A | 3.1 | 5.3 | 8.9 | 5.3 | 8.9 |

[1] 1% resin added (based on dry pulp).
[2] Viscosity has passed through a maximum and is now decreasing.

It will thus be seen that the present invention provides cationic thermosetting polyamide-epichlorohydrin resins having good stability against gelation and loss of wet-strength efficiency. While these resins have been shown herein to be particularly useful as wet-strength resins for paper, they have also been found to be useful in many other applications such as insolubilizing agents for water-soluble polymers, aids or assistants in the application of water-soluble and water-insoluble coatings, impregnating and sizing materials to paper and the like, as bonding agents in the preparation of mineral fiber sheets, mats and the like and in the preparation of nonwoven fabrics, as an agent for preventing shrinkage and felting of wool, as an anchor coat for nonfibrous regenerated cellulose film and so on.

What I claim and desire to protect by Letters Patent is:

1. The process of stabilizing an aqueous solution of a cationic water-soluble thermosetting resin obtained by reacting a polyalkylene polyamine having two primary amine groups and at least one secondary amine group with a dicarboxylic acid selected from the group consisting of diglycolic acid and $C_3$ to $C_8$ saturated aliphatic dicarboxylic acids in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5 to 1 to about 1.8 to 1 to form the water-soluble cationic thermosetting resin which comprises adding formic acid to the aqueous solution of cationic thermosetting resin to adjust the pH thereof to the range from about 3.0 to about 4.0 and then adding sulfuric acid to further adjust the pH thereof to the range from about 2.0 to about 3.0.

2. The process of claim 1 in which the pH of the polyamide is adjusted to a range from about 8.5 to about 9.0 prior to reaction with the epichlorohydrin.

3. The product produced in accordance with the process of claim 1.

No references cited.

MURRAY TILLMAN, *Primary Examiner.*